Patented Jan. 29, 1924.

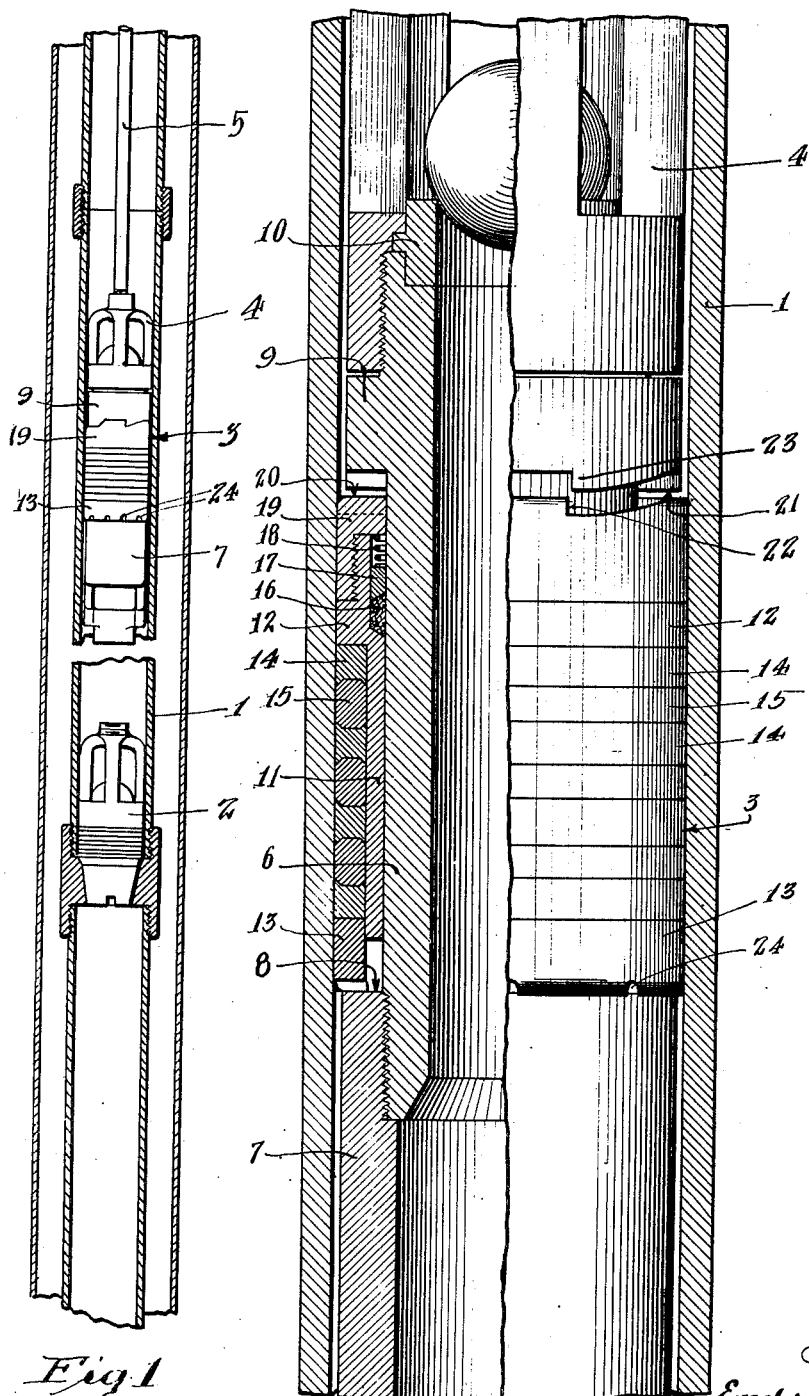

1,482,141

UNITED STATES PATENT OFFICE.

EMERSON M. PARKS, OF SAWTELLE, CALIFORNIA.

PACKING STRUCTURE.

Application filed October 24, 1922. Serial No. 596,633.

*To all whom it may concern:*

Be it known that I, EMERSON M. PARKS, a citizen of the United States, residing at Sawtelle, in the county of Los Angeles and State of California, have invented a new and useful Packing Structure, of which the following is a specification.

This invention relates to plunger packings and is particularly directed to a packing structure of an automatic character under control of the pressure packed against.

An object of the invention is to provide a packing structure in which the packing pressure is dependent upon the pressure packed against in a relative ratio in which the packing pressure is greater than said pressure packed against.

A further object is to provide a packing structure in which compressible packing rings are axially compressed by means exposed to the pressure packed against and in which the surface of the rings engaged by said means is less than the surface exposed to said pressure.

Another object is to provide a packing structure associated with a deep well pump plunger and cooperating with means for rotating the packing during an insertion of the pump plunger into a well tubing.

Various other objects and advantages will be more fully apparent from the following description of the accompanying drawings, which form a part of this disclosure, and which illustrate a preferred form of embodiment of the invention.

Of the drawings:

Fig. 1 is a vertical section through an ordinary type of oil well apparatus.

Fig. 2 is an enlarged portion of Fig. 1 showing the pump plunger partly in section, and having associated with it my improved packing structure.

In the drawings, 1 designates the pump tubing which usually comprises a plurality of pipe sections joined by couplings, and which near its lower end is provided with a standing valve 2. Between two of the pipe sections is a working barrel 3 or cylinder in which the pump plunger reciprocates in a pumping operation, the pump plunger terminating with a valve cage 4, which attaches to the lower end of a sucker-rod 5 by which the pump is operated. The pump plunger shown in detail in Fig. 2, has a tubular body member 6, the lower end of which is screw-threaded into a tubular end member 7 providing an annular seat 8. The member 7 may, if desired, be formed for connection with a garbutt-rod or for connection with other mechanism, but as such connection has no particular bearing upon the present invention detailed illustration thereof is herein omitted. The upper portion of the body 6 has an annular shoulder 9 and its upper end is recessed to receive a valve seat member 10 and is externally screw-threaded to receive the valve cage 4 which clamps the seat member in place.

The packing structure surrounds the body 6 between the seat 8 and the shoulder 9, and in the present embodiment such structure comprises a sleeve or follower 11 having an annular shoulder 12, a metal ring 13 accurately machined to fit the barrel 3 and the sleeve 11, and a plurality of alternate packing rings 14 and 15 surrounding the sleeve 11 between the shoulder 12 and the ring 13. Of the several packing rings, the rings 14 are preferably formed of relatively soft metal such as copper, brass or babbitt, or or hard fiber, and the intermediate rings 15 preferably of leather, rubber, or fibrous packing material such as asbestos.

The sleeve 11 is accurately machined to have a close sliding fit on the body 6 and its upper end is internally recessed to provide a packing chamber in which is positioned suitable packing material 16 engaged by a follower ring 17. A spring 18 retains the follower against said packing material and the spring is retained in place by a top ring 19 screw-threaded upon and forming a part of the sleeve 11.

The upper surface 20 of the sleeve 11, as a part of the follower, and the lower surface 21 of the shoulder 9 have co-engaging clutch teeth 22 and 23, so that if in inserting the pump plunger into a well tubing the packing becomes wedged in uneven or undersized tubing or for any reason becomes caught at some point in the tubing, the teeth will be engaged, whereupon a turning of the sucker-rod to rotate the packing structure coupled with a downward pressure will give the structure a screw-action enabling it to work past such point.

Normally the sleeve 11 is some distance above the seat 8, and to prevent a cushion effect which would tend to retard the downward movement of said sleeve, the lower surface of the ring 13 has a plurality of ports 24 which permits an escape of liquid or gas from the space below the lower end of the sleeve.

In use, the packing structure above described has an automatic action which is caused by the weight of liquid in the well tubing above the pump plunger, that is, the weight of such liquid, which is in this instance the liquid packed against, acting upon the upper surface 20 of the follower exerts a downward pressure thereon and effects a downward translation of the follower upon the body 6. Such translation of the follower upon the plunger body causes the several packing rings to be subjected to an axial clamping action by which the compressible rings 15 will be compressed and forced against the wall of the working-barrel 3 and the sleeve 11 to a degree depending upon the pressure exerted upon the follower.

Thus the packing pressure of the packing rings upon the wall of the working-barrel has a definite relation to the pressure packed against, it being evident that such packing pressure will vary with variations in the pressure exerted upon the surface 20 of the follower. It will be understood that if the pressure packed against is, say 500 pounds per square inch, I may by making the area of the surface 20 two square inches, have a total compressing pressure of 1000 pounds upon the follower, and by making the area of lower surface of the shoulder 12, and of the co-engaging surfaces of the several rings one square inch, said compression pressure of 1000 pounds is transmitted to said one square inch area, therefore, I have a packing pressure which is greatly in excess of the pressure packed against.

It will be understood that as the pressure in the cylinder or working barrel above the plunger increases the packing pressure of the rings against the sleeve 11 and the wall of the working barrel will be increased in proportion, and further that upon the non-pumping or down stroke of the plunger the pressure packed against being decreased, will result in a correspondingly decreased packing pressure, at the same time always maintaining a packing pressure in excess of the pressure above the plunger.

From the above it will be evident that I have provided a packing structure, the efficiency of which increases with an increase in the load and decreases with a decrease in the load.

While the specific structure herein illustrated and described is well adapted to fulfil the objects primarily stated it is to be understood that I do not wish to limit the invention to the one embodiment herein disclosed, for it is susceptible of embodiment in various other forms, all coming within the scope of the following claims.

I claim:

1. In a device of the nature disclosed, two relatively movable concentric members, one of said members having an annular seat and carrying a packing structure, said packing structure comprising an axially movable sleeve having an annular shoulder and a reduced portion below said shoulder, and a compressible packing ring between said annular seat and said annular shoulder, the upper surface of the sleeve being exposed to the pressure packed against, whereby said pressure will translate the sleeve to compress the packing ring and force it against the walls of the sleeve and of the other of said members.

2. In a device of the nature disclosed, two relatively movable concentric members, one of said members having an annular seat and carrying a packing structure, said packing structure comprising an axially movable sleeve having an annular shoulder and a reduced portion below said shoulder, and a plurality of packing rings between said annular seat and said annular shoulder, the alternate rings being of compressible material and the intermediate rings of relatively non-compressible material, the upper surface of the sleeve being exposed to the pressure packed against whereby said pressure will translate the sleeve to compress the compressible rings and force them against the walls of the sleeve and of the other of said members.

3. In a device of the nature disclosed, a cylinder, a plunger slidable therein and having an annular seat, a packing structure carried by the plunger and comprising a sleeve slidable thereon above said seat and having an annular shoulder and a reduced portion below said shoulder, and a packing ring surrounding said reduced portion of the sleeve between said shoulder and said seat, the upper surface of the sleeve being exposed to the pressure within the cylinder, whereby said pressure will translate the sleeve to compress the packing ring and force it against the walls of the sleeve and of the cylinder.

4. In a device of the nature disclosed, a cylinder, a plunger slidable therein and having an annular seat, a packing structure carried by the plunger and comprising a sleeve slidable thereon above said seat and having an annular shoulder and a reduced portion below said shoulder, and a packing ring surrounding said reduced portion of the sleeve between said shoulder and said seat, the upper surface of the sleeve being exposed to the pressure within the cylinder, whereby said pressure will translate the sleeve to compress the packing ring and force it against the walls of the sleeve and of the cylinder, and means permitting escape of pressure from below the sleeve.

5. In a device of the nature disclosed a cylinder, a plunger slidable therein and having an annular seat, a packing structure carried by the plunger and comprising a sleeve slidable thereon and having an annular shoulder and a reduced portion below said shoulder, and a plurality of packing rings surrounding said reduced portion of the sleeve in superposed relation between said seat and said shoulder, the alternate rings being of compressible material and the intermediate rings of relatively non-compressible material, the upper surface of the sleeve being exposed to the pressure within the cylinder whereby said pressure will axially translate said sleeve to compress the compressible rings and force them against the walls of the sleeve and of the cylinder.

6. In a device of the nature disclosed a cylinder, a plunger slidable therein and having an annular seat, a packing structure carried by the plunger and comprising a sleeve slidable thereon and having an annular shoulder and a reduced portion below said shoulder, and a plurality of packing rings surrounding said reduced portion of the sleeve in superposed relation between said seat and said shoulder, the alternate rings being of compressible material and the intermediate rings of relatively non-compressible material, the upper surface of the sleeve being exposed to the pressure within the cylinder whereby said pressure will axially translate said sleeve to compress the compressible rings and force them against the walls of the sleeve and of the cylinder, and means permitting escape of pressure from below the sleeve.

7. In a device of the nature disclosed, a cylinder, a plunger slidable therein and having an annular seat, a packing structure carried by the plunger and comprising a sleeve slidable thereon above said seat and having an annular shoulder and a reduced portion below said shoulder, and a packing ring surrounding said reduced portion of the sleeve between said shoulder and said seat, and packing means between the sleeve and the plunger, the upper surface of the sleeve being exposed to the pressure within the cylinder whereby said pressure will translate the sleeve to compress the packing ring and force it against the walls of the sleeve and of the cylinder.

8. In a device of the nature disclosed, a cylinder, a plunger slidable therein and having an annular seat, a packing structure carried by the plunger and comprising a sleeve slidable thereon above said seat and having an annular shoulder and a reduced portion below said shoulder, and a packing ring surrounding said reduced portion of the sleeve between said shoulder and said seat, the upper surface of the sleeve being exposed to the pressure within the cylinder, whereby said pressure will translate the sleeve to compress the packing ring and force it against the walls of the sleeve and of the cylinder, the sleeve and the plunger being provided with clutch means adapted to be brought into cooperation whereupon the plunger and sleeve may be rotated together.

Signed at Los Angeles, California, this 18th day of October, 1922.

EMERSON M. PARKS.